(12) United States Patent
DeShan et al.

(10) Patent No.: US 7,373,415 B1
(45) Date of Patent: May 13, 2008

(54) SYSTEM AND METHOD FOR MONITORING DELIVERY OF DIGITAL CONTENT, INCLUDING STREAMING MEDIA

(75) Inventors: Jay Brent DeShan, McKinney, TX (US); Chad Ric Gray, Plano, TX (US); Jared Felner, Plano, TX (US); Raul Giacoman, The Colony, TX (US); Ghousuddin Syed, Richardson, TX (US); Anthony Joseph Rodiger, The Colony, TX (US)

(73) Assignee: Yahoo! Inc., Sunnyvale, CA (US)

( * ) Notice: Subject to any disclaimer, the term of this patent is extended or adjusted under 35 U.S.C. 154(b) by 895 days.

(21) Appl. No.: 10/789,644

(22) Filed: Feb. 27, 2004

Related U.S. Application Data

(60) Provisional application No. 60/491,770, filed on Jul. 31, 2003.

(51) Int. Cl.
*G06F 15/16* (2006.01)
(52) U.S. Cl. .................................................. 709/231
(58) Field of Classification Search ................ 709/231, 709/203, 223, 224
See application file for complete search history.

(56) References Cited

U.S. PATENT DOCUMENTS 5,862,342 A * 1/1999 Winter et al. ............... 709/231
7,216,165 B2 * 5/2007 Dalal et al. ................. 709/224
2004/0030796 A1 * 2/2004 Cooper et al. .............. 709/231

OTHER PUBLICATIONS

Rickard, Jack. "Mapping the 'net with Traceroute" http://info-x.co.uk/docview.asp?id=49. May 2003.
"Connected: An Internet Encyclopedia" Traceroute. http://www.freesoft.org/CIE/Topics/54.htm. May 2003.
"Introduction to Streaming Media". http://www.cvc4.org/mentorworkshop/streamingmedia/intro2streaming.htm. May 2003.
Griffin, Al and Photograph by Michel Tcherevkoff. "Video on the Net. How good can video look on the Internet? With all the latest streaming technology, pretty good." http://popularmechanics.com/technology/computers/ 1998/3/Video_Streaming/print.phtml . May 2003.

* cited by examiner

*Primary Examiner*—Frantz B. Jean
(74) *Attorney, Agent, or Firm*—Greenberg Traurig, LLP; James J. DeCarlo

(57) ABSTRACT

A system for monitoring digital content, including streaming media having one or more client test machines configured to receive and test digital content; one or more streaming servers configured to read content and provide the digital content to the client test machines; and one or more application servers configured to provide a test data file, having a URL to an item of the digital content, to the client test machines. The client test machines store the test results and transmit them to an application server for analysis. The application server may aggregate the information and sort the information via various categories of test results to pinpoint the location of potential points of failure along the path providing the digital content.

3 Claims, 14 Drawing Sheets

AT 5/20/2003 2:17 PM, stream have encountered 0 or Overview Details for WMFILE1.XYZ.YAHOO.COM — 905

Overview Details - Microsoft Internet Explorer

960 — 900
Choose Columns — 1105

| Detail 950 | Test Tracking ID 940 | Duration To Test 1110 | Connect Step 1 Locate Server Duration | Connect Step 2 Connect To Server Duration | Connect Step 3 Meta Data Received Duration | Connect Step 4 Ready to Stream Duration | Total Connect Duration | Initial Buffer Duration | Additional Buffer Duration | Total Buffer Duration | Actual Test Duration | Total Error Count | Total Buffer Count |
|---|---|---|---|---|---|---|---|---|---|---|---|---|---|
| O | 25821067 | 15 | 70 | 0 | 40 | 361 | 471 | 5808 | 0 | 5808 | 21872 | 0 | 1 |
| O | 25821315 | 15 | 50 | 0 | 260 | 461 | 771 | 5808 | 0 | 5808 | 22051 | 0 | 1 |
| O | 25821418 | 0 | 40 | 0 | 201 | 270 | 511 | 0 | 0 | 0 | 511 | 0 | 0 |
| O | 25821538 | 15 | 50 | 0 | 150 | 301 | 501 | 5808 | 0 | 5808 | 21891 | 0 | 1 |
| O | 25821783 | 0 | 70 | 0 | 10 | 340 | 420 | 0 | 0 | 0 | 420 | 0 | 0 |
| O | 25821801 | 15 | 100 | 0 | 0 | 601 | 701 | 5829 | 0 | 5829 | 21851 | 0 | 1 |
| O | 25822335 | 15 | 50 | 0 | 90 | 360 | 500 | 5808 | 0 | 5808 | 21871 | 0 | 1 |
| O | 25822528 | 0 | 51 | 0 | 70 | 180 | 301 | 0 | 0 | 0 | 301 | 0 | 0 |
| O | 25822592 | 0 | 60 | 0 | 50 | 431 | 541 | 0 | 0 | 0 | 541 | 0 | 0 |

FIG. 9

3 2:17 pm stream have encountered 0 or more times.
View Details for WMFILE1.XYZ.YAHOO.COM

900

| Additional Buffer Duration | Total Buffer Duration | Actual Test Duration | Total Error Count | Total Buffer Count | Stream Server DNS | Stream Server IP | Archive Server | Start Time | Trace Start IP |
|---|---|---|---|---|---|---|---|---|---|
| 0 | 5808 | 21872 | 0 | 1 | WMFILE1.XYZ.YAHOO | 63.123.456.1 | BUS1.XYZ.YAHOO | 5/20/2003 12:17:33 PM | 63.888.123.1 |
| 0 | 5808 | 22051 | 0 | 1 | WMFILE1.XYZ.YAHOO | 63.123.456.1 | BUS2.XYZ.YAHOO | 5/20/2003 12:21:00 PM | 63.888.123.2 |
| 0 | 0 | 511 | 0 | 0 | WMFILE1.XYZ.YAHOO | 63.123.456.1 | BUS3.XYZ.YAHOO | 5/20/2003 12:22:22 PM | 63.888.123.3 |
| 0 | 5808 | 21891 | 0 | 1 | WMFILE1.XYZ.YAHOO | 63.123.456.1 | • | 5/20/2003 12:23:51 PM | • |
| 0 | 0 | 420 | 0 | 0 | WMFILE1.XYZ.YAHOO | 63.123.456.1 | • | 5/20/2003 12:27:13 PM | • |
| 0 | 5829 | 21851 | 0 | 1 | WMFILE1.XYZ.YAHOO | 63.123.456.1 | • | 5/20/2003 12:27:18 PM | • |
| 0 | 5808 | 21871 | 0 | 1 | WMFILE1.XYZ.YAHOO | 63.123.456.1 | • | 5/20/2003 12:34:16 PM | • |
| 0 | 0 | 301 | 0 | 0 | WMFILE1.XYZ.YAHOO | 63.123.456.1 | • | 5/20/2003 12:36:52 PM | • |
| 0 | 0 | 541 | 0 | 0 | WMFILE1.XYZ.YAHOO | 63.123.456.1 | BUSx.XYZ.YAHOO | 5/20/2003 12:37:40 PM | 63.888.123.M |

FIG.10

SYSTEM AND METHOD FOR MONITORING DELIVERY OF DIGITAL CONTENT, INCLUDING STREAMING MEDIA

CROSS REFERENCE TO RELATED APPLICATIONS

This application claims priority to co-pending U.S. Provisional Application No. 60/491,770 entitled, "System And Method For Monitoring Delivery Of Digital Content, Including Streaming Media" filed on Jul. 31, 2003 and assigned to the assignee of the present invention, the entire contents of which are hereby incorporated by reference.

BACKGROUND OF INVENTION

1. Field of the Invention

The present invention relates generally to systems and methods for monitoring delivery of digital content and, more particularly, to a method and system for allowing observation and diagnosis of the relative integrity of streaming content, including both the actual content and the infrastructure used to deliver the content, including a network, such as the Internet.

2. Description of Related Art

With the advent of the Internet and the World Wide Web and with advances in achieving ever increasing, affordable bandwidth, an industry has developed around the delivery of digital content, especially streaming media content. By way of example, streaming media may be used for any of a number of purposes, including entertainment, distance learning and corporate purposes. Entertainment companies stream movies, music, and sporting events, distance learning companies stream educational content, and corporations stream training materials, presentations and commercials.

Although some streaming media content providers may have relatively few items of content to provide, some content providers have hundreds, even thousands of content files. Storing and streaming this number of content files can be costly. Furthermore, streaming content requires a level of technical expertise often not found in companies focusing on creating content. Consequently, content creators and providers have turned to service providers to store and stream content on behalf of the content providers.

As more content providers turn to service providers for their streaming technology needs, service providers must manage more client accounts and greater numbers of content files. Furthermore, to maintain existing content provider clients and attract new clients, service providers must provide a content management system and delivery system that is reliable and is easy for the content providers to use.

Presently, there is no system that is capable of analyzing the relative integrity of a streaming media system. In general, as the number of users that use a system and the number of data files that are cataloged and indexed for use on a system increase, so too does the potential for poor performance. For example, too many users accessing a limited number of servers providing the streaming media creates a bottleneck that degrades the access time for each user. Similarly, a hardware conflict or malfunction on a particular server that provides streaming media content could seriously degrade system performance. Likewise, a path between the server and an individual user or a group of users could be damaged, either by accident or intentionally, thus degrading or even preventing access to the streaming media.

Accordingly, there remains a need for a system and method to diagnose the efficiency of a system that provides digital content, including streaming media, and identify potential points of failure or performance degradation within the system.

SUMMARY OF THE INVENTION

Embodiments of the present invention solve the foregoing and other needs. In certain embodiments, a method and system is provided for diagnosing the efficiency of a system that provides digital content, including streaming media data. One such system comprises one or more client machines and one or more streaming servers connected via a network, such as the Internet. The client machine requests a test data file from an application server and monitors the progress of connecting, obtaining, buffering and playing the digital content. In an alternate embodiment, an application server could send a test data file to each client test machine connected to the server. The information obtained during the process of playing the stream is sent back to an application server for processing. In another embodiment, a method is provided for identifying potential points of failure within this system. The method stores the individual test data from each client test machine and aggregates the information. Calculations are performed on the test data to determine the location of any potential points of failure or degradation.

BRIEF DESCRIPTION OF THE DRAWINGS

These and other features of certain embodiments will become apparent from the following detailed description considered in connection with the accompanying drawings, which are attached hereto and form a part hereof. It should be understood, however, that the drawings are designed for the purpose of illustration only and not as a definition of the limits of the invention.

In the drawings, wherein similar reference characters denote similar elements throughout the several views:

FIG. 9 is a screen shot illustrating overview details for a selected entry according to FIG. 8;

FIG. 10 is a continuation of the screen shot of FIG. 9;

DETAILED DESCRIPTION OF CERTAIN EMBODIMENTS

Figure 1:
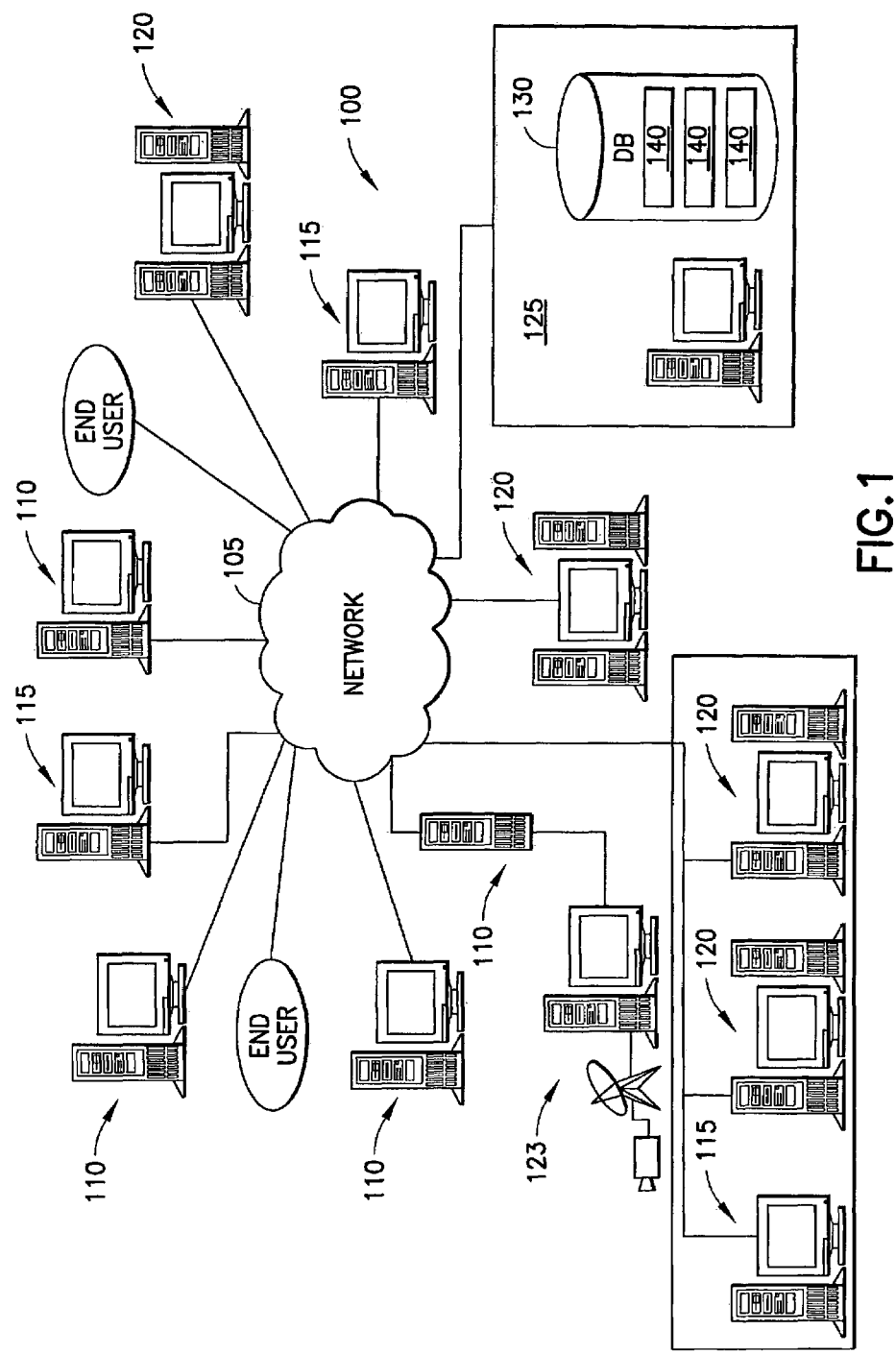
FIG. 1 is a schematic illustrating the system architecture according to one embodiment of the present invention.

Certain embodiments of the present invention will now be discussed with reference to the aforementioned figures, wherein like reference numerals refer to like components. Turning first to the schematic of FIG. 1, a system 100 according to one embodiment of the present invention is shown. In general, the system 100 allows a plurality of client test machines 115 to request digital content from a plurality of streaming servers 110, the digital content being stored local to the streaming server 110, on one or more archive filer servers 120 or broadcast from one or more live encoders 123 coupled, either directly or indirectly, to the streaming servers 110 (collectively referred to as "content servers"), where each device is connected to a network 105. In addition, a plurality of end users are connected to network 105. The end users may either access the digital content directly, through separate processors, such as a PC, web enabled cellphone or other device, or access the content through client test machine 115. Each device may be connected to network 105 by any means known or developed, for example, dial up modems, cable modem, digital subscriber lines (DSL), wireless modems, satellite dishes, optical cable and the like, and through any known or developed protocol. In alternate embodiments of the present invention, the digital content may be stored directly on streaming servers 110. In system 100, an application server 125 contains a database 130 having a plurality of test data files 140. These test data files 140 contain information for accessing a streaming server 110 and a streaming media file 220 located on archive filer server 120 or live encoder 123. Client test machine 115 utilizes the information contained in test data files 140 stored in data base 130 and tests the efficiency of the connection, over network 105, between client test machines 115 and streaming servers 110. The test results determined by the client test machines 115 may be stored in test data file 140 or other file, either on a test-by-test basis or in an aggregated form and forwarded to application server 125 for further processing.

It is understood that client test machines 115 are personal computers (PC) in the present embodiment, but could be web enabled cellular telephones, personal digital assistants (PDA) and the like, coupled to network 105 by any known or developed manners, including, but not limited to, dial up modems, DSL, cable modems or wireless devices, such as Bluetooth or a Wi-Fi interface. In addition, network 105 may be the Internet, the worldwide web, local area network, wide area network or an internal corporate or government network and the like.

Each client test machine 115 includes a storage device, a memory device, an input device and a display device connected to a processor, as well as an internet browser, such as that offered by Microsoft Corporation under the trade name Internet Explorer. Additionally, client test machine 115 may include a media player, such as that offered by Microsoft Corporation under the trade name Windows Media Player or that offered by Real Networks Corporation under the trade name RealPlayer.

Although not depicted in the figures, the servers and PCs described herein generally include such other art recognized components as are ordinarily found in server systems, including but not limited to CPUs, RAM, ROM, memory, permanent and removable disk drives, clocks, hardware drivers, interfaces, and the like. The servers are preferably configured using the Windows®NT/2000, UNIX or Sun Solaris operating systems, although one skilled in the art will recognize that the particular configuration of the servers is not critical to the present invention. Furthermore, different tasks, illustrated herein as being performed on separate and distinct servers, may, in some embodiments, be performed on the same server. Conversely, individual tasks, illustrated herein as being performed on a single server, may be distributed among several servers.

It is to be understood that although the present embodiment is described in terms of windows media content for use with Windows Media Player, it is within the scope of the present invention to utilize any media content, or any media format heretofore or hereafter known or any combination thereof. Furthermore, it is to be understood that although the present embodiment is described in the context of streaming media such as streaming audio, video and combined audio/video, the present invention is applicable to digital content other than streaming media, such as text, still images, web pages, software downloads and the like. In addition, while the process refers to using archive filer servers 120 for storing and providing the digital content to the streaming server 110, it is to be understood that one or more of the plurality of live encoders 123 may be used in conjunction with or as an alternative to the archive filer servers 120.

Figure 2:
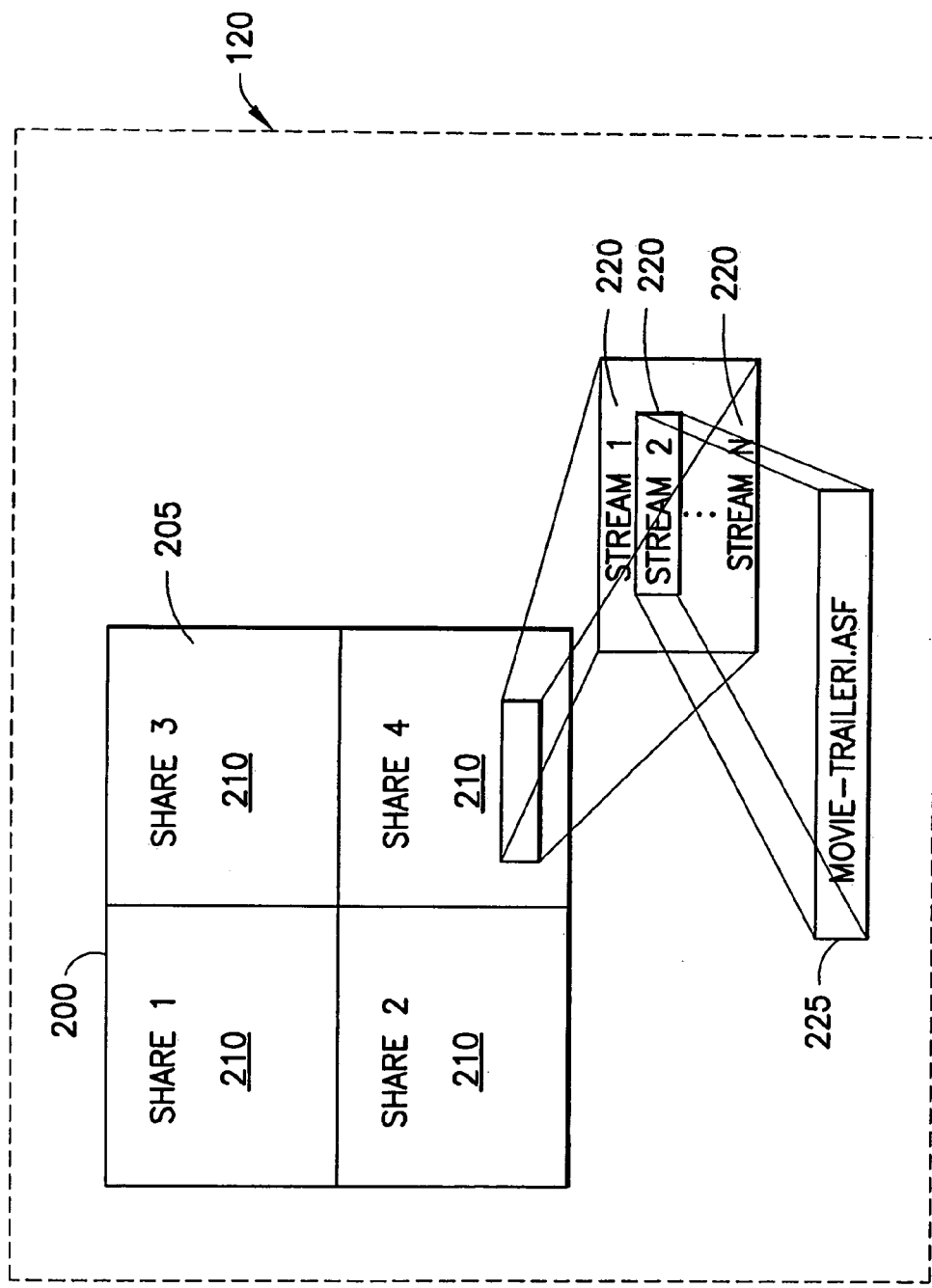
FIG. 2 is a block diagram of a file structure on a filer server according to one embodiment of the present invention.

Referring to FIG. 2, there is shown a block diagram of a filer 200 within archive filer server 120. Archive filer server 120 is comprised of filer 200, which is further divided into a plurality of shares 210. Filer 200 is the location or portion of the filer server's associated storage where the digital content files are stored. Given the large size of streaming media data files, it is understandable that filer 200 may have the ability to store vast amounts of digital data. Accordingly, filer 200 may be any suitable storage, including networked storage, optical devices, magnetic devices, a RAID collection of disc drives and the like.

The division of filer 200 into a plurality of logical portions or shares 210 facilitates location of streaming media data files by the streaming media servers. Each share 210 is further divided into streaming media data files 220 that are used to test the integrity of system 100 and the playback of file 220 on the client test machines 115. Each streaming media data file 220 contains a unique title 225, which may include a stream ID to describe and locate the particular streaming media content. In the example illustrated in FIG. 2, stream number "2" is a streaming media data file entitled "Movie-Trailer1.ASF" in the Microsoft Windows media format. This is indicated by the extension of the data file ".ASF". As described in greater detail below, Test data files 140 contain, among other things, a URL to each file 220 in order to test the system 100 by connecting to and playing files 220. In accordance with an alternate embodiment of the present invention, media data files 1 through "n" 220 are stored on each share 1 through "m" 210. As such, system 100 preferably can test every content server connected to network 105 and, for archive filer servers 120, every share 210 on each filer 200, although in other embodiments, not every share and/or server need be tested. In another alternate embodiment, the media data file 220 may be a single file distributed to each share 210, thus resulting in one stream ID per share 210 per filer 200. It is to be understood that the data file 220 may take any number of forms, including, for example, a separate pointer to or file containing each item of streaming media content, a URL for accessing a web page, a text file, an executable program and the like.

Each share 210 is assigned a mount point, which is a pointer in memory to a corresponding share 210 on a particular filer 200. Each streaming server 110 has a copy of the mount point information for each share 210 on each content server which facilitates the location of a particular streaming media data file 220. Accordingly, the streaming servers 110 are able to locate streaming media content 220 data stored on content servers very rapidly.

In general, the present embodiment permits one or more client test machines 115, to request one or more test data files 140 containing streaming media data from one or more streaming servers 110 and to test the digital content and the connection to the streaming server 110 providing the digital content. When client test machine 115 (or a separate machine communicating with the network, such as an administrator terminal, in alternate embodiments) requests streaming media data from the streaming server 110, the streaming server 110 accesses a particular archive filer server 120, depending upon information contained in the test data files 140, and provides the requested information file 220 to the client test machine 115.

The files 220 stored on each filer 120 are fixed digital content as opposed to a live video feed. Accordingly, these archive filer servers 120 provide data to streaming servers 110, and streaming servers 110 distribute the streaming media to the client test machine 115 requesting the test stream. Streaming media servers 110 are configured to permit distribution of the same digital media streams to the plurality of client test machines 1115. Additionally, other streaming servers 110 may provide only live content to requesting test machines 115. As such, the live streaming media data is encoded on live encoder 123 and broadcast via streaming server 110. Though the present embodiment is described in terms of providing streaming media and testing the streaming media from archive filer server 120, it is understood that the embodiment may also provide streaming data from live encoder 123 connected to streaming servers 110, as well.

In such embodiments, the test file 140 may include additional information, such as that identifying the encoder 123 and/or streaming server 110. The live encoder 123, by its nature, presents digital content, such as video and/or audio information, in real time or in near real time. The live encoder 123 receives video signals from a source such as a camera and transmits the encoded data to a streaming server 110. Since the data is live, it is broadcast without using archive filer server 120. While a copy may be stored on filer 200 for subsequent playback, the live transmission is connected directly to server 110. According to an embodiment of the present invention, the live encoder 123 may be connected to a camera that is fixed on a particular location for testing purposes, and therefore, always on. In the present embodiment the URL of server 110 that is connected to live encoder 123 is fixed and does not change. Therefore, tests can be constructed that reference this URL as part of the information contained in the test data files 140.

While FIG. 2 depicts an illustrative diagram of archive filer server 120, it is understood that the present invention functions equally as well with live encoder 123. Live encoder 123 is comprised of a media source, such as a microphone and/or camera, and a hardware encoder 123 that receives a live signal and encodes the data for broadcast via streaming server 110. Since live encoder 123 is connected to streaming server 110 and a media source, the encoder does not contain a filer, shares or mount points as the live data is encoded and broadcast directly from streaming server 110.

Figure 3:
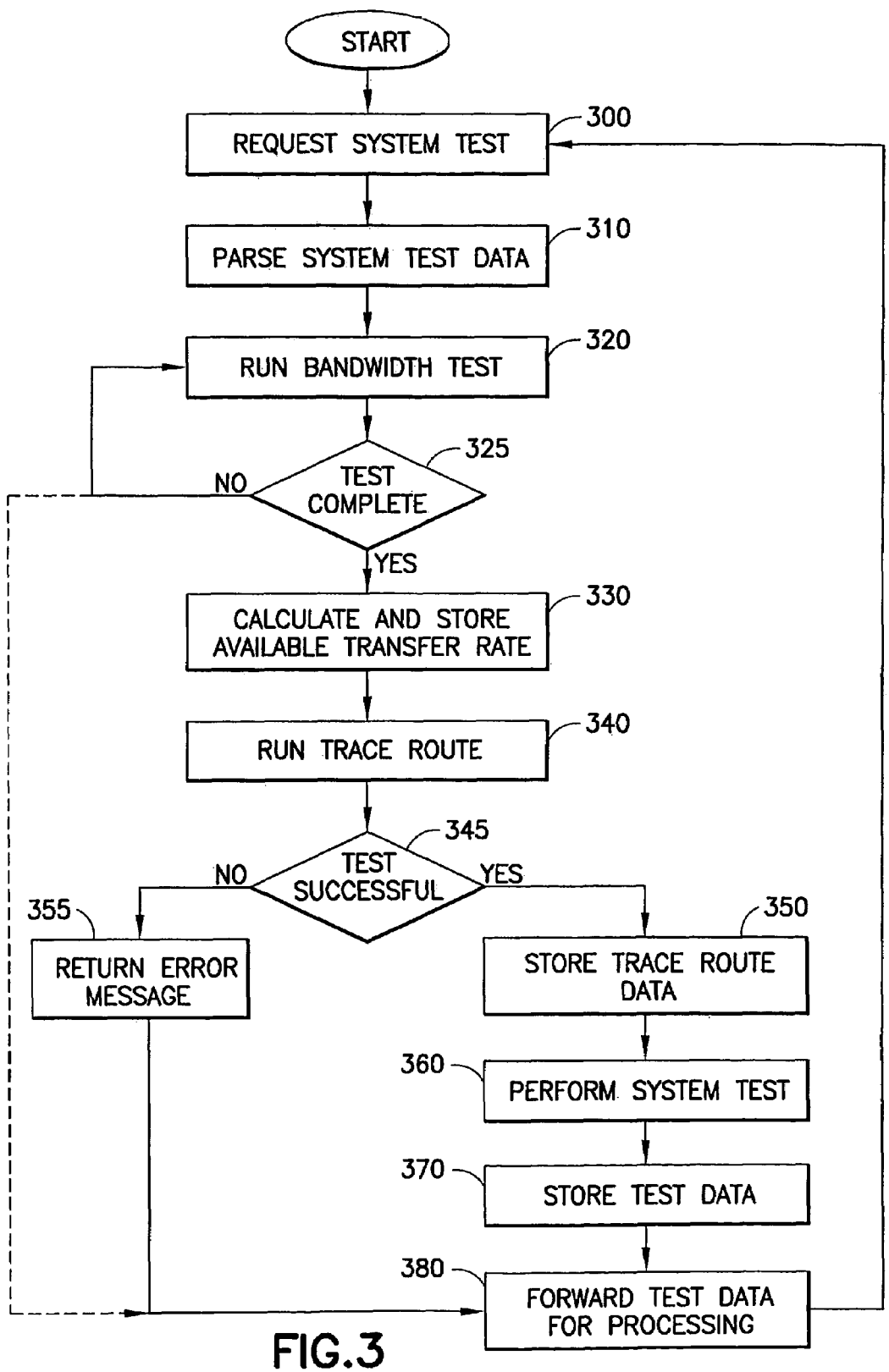
FIG. 3 is a flow chart illustrating the process of testing the system of FIG. 1.

Turning now to FIG. 3, there is shown a flow chart illustrating the process of a client test machine 115 requesting and performing a test according to an embodiment of the present invention. The testing of System 100 may include various categories of sub tests, such as, testing the available bandwidth, testing of the transmission of data across network 105 and testing of the playback of the digital content on test machine 115. Each of these test categories may be further broken down into sub tests. For example, the testing of the Bandwidth may be accomplished using the method as described in U.S. Pat. No. 6,601,009 which issued on Jul. 29, 2003 entitled, "Method And System Of Automatic Bandwidth Detection" filed Jul. 12, 2001 which is commonly owned by the assignee of the present invention, the entire disclosure of which is hereby incorporated by reference. In addition, the testing of the playback of digital content may be accomplished by incorporating a playback window in a graphical user interface ("GUI") as described below with reference to FIGS. 6 and 7. The type of tests performed is identified in test data file 140, and the corresponding information needed to run a particular test is similarly included in the test file 140.

In step 300, client machine 115 first requests a test data file 140 from application server 125. The test data files 140 are stored in a database 130 in the form of a queue and comprise information or parameters that permits a client machine 115 to identify and perform a test on the digital content 220 and system 100 to transport the digital content. In the present embodiment, the test data file 140 is in the form of an extensible mark-up language ("XML") file containing the streaming server DNS, the streaming server URL, the test name, test data file identifier the streaming server IP address, the URL (e.g., server and path location) of the test digital content file 220, bandwidth rate, and length of content file 220; however, in alternate embodiments more or less information is included. Furthermore, different items of content 220, different client test machines 115, different streaming servers 110 or other components, or combinations thereof, may have different test files and/or tests associated therewith. Furthermore, it is understood that the test data files 140 may be coded in other computer readable languages and may contain additional, fewer or different information to perform the test. In an alternate embodiment, the test date files 140 may be stored in a queue located on a hard disk in application server 125.

Once the test data file is received, machine 115 parses the system test data. Step 310. This step individually identifies the data contained in test data files 140 for subsequent use in the testing process. Next, machine 115 performs a bandwidth test to determine the appropriate data transfer rate. Step 320. In the present embodiment, for example, the test streaming media files 220 are streamed at 28.8 kb/sec., 100 kb/sec. and 300 kb/sec. These data rates correspond to rates associated with traditional dial-up modems, DSL modems, and cable modems which are used to access data service providers; however, the rates could be set at higher or lower rates depending upon the capabilities of the streaming server 110 and client machine 115. The higher the data transfer rate, the clearer and more fluid the streaming media is displayed. Fewer, additional or different data transfer rates can be used without departing from the spirit and scope of the present invention.

The bandwidth test may be performed by any means known currently or developed in the future as the system 100 can be modified to include the relevant test information. In an additional embodiment, the bandwidth test is performed when client test machine 115 accesses a relatively large bandwidth data file on application server 125. The bandwidth data file is used solely to test the available bandwidth. Machine 115 starts a timer at the beginning of a test, and after a fixed period of time, the timer is stopped. Dividing the amount of data received by machine 115 by the period of time yields an indication of the available bandwidth, or data transfer rate, from application server 125 to client test machine 115 (e.g., Kbytes/second). Accordingly, as discussed below, data streams are requested at data transfer rates that match the capability of the client test machine 115. In an alternate embodiment, the bandwidth data file may be stored on a streaming server 110 and the test machine 115 may request the file directly from a streaming server 110.

Once the available bandwidth transfer rate is determined, client machine 115 determines what transfer rate most closely matches the previously determined transfer rate and stores the transfer rate on machine 115. Step 330. Each test data file 140 contains a link to files 220 that are stored at various transfer rates. Depending upon the transfer rate stored on client machine 115, machine 115 accesses those files 220 that correspond to the available transfer rate of machine 115. In an alternate embodiment of the invention, a small text file (e.g., a "cookie") is stored on machine 115 that identifies machine 115's transfer rate and preference for media format. The higher the transfer rate, the larger the amount of data that can be transferred to client test machine 115 and as such, the file 220 can be larger and contain more streaming media data, either, for example, a higher resolution or more frames per second, etc.

In step 325 the system 100 determines whether or not the Bandwidth test being performed in step 320 is complete. If not, the test continues. If after a predetermined number of attempts, the bandwidth test is still unsuccessful, the system will return an error message and proceed to forward all test data to application server 125. Step 380. If the test is complete, machine 115 calculates and stores the available transfer rate. Step 330. Next, client machine 115 performs a Transmission test that may include a trace route test. Step 340. The trace route program is almost universally available. An instantiation of a trace route test is included in almost every operating system, including that provided by Microsoft Corporation under the tradename WINDOWS 2000. In general, trace route allows a user to print out a list of all of the intermediate routers or other devices between two destinations on the Internet through which a file is transferred. It allows a user to note or diagram a path through the network, and in the present embodiment, the path from client test machine 115 to streaming server 110, including any hard ware comprising the network 105. In order to determine if a path to server 110 exists, machine 115 determines whether or not the trace route performed in step 340 is successful. Step 345. If not, an error message is returned indicating that no path could be established (in step 355), and the process forwards all test data to the application server. Step 380. An unsuccessful trace route indicates that there is a break in the path from client test machine 115 to streaming server 110. In an alternate embodiment, there may be additional information in the test file 140 to connect to and play content 220 from an alternate or backup server 110. If the test was successful, machine 115 stores the trace route data, (in step 350), and performs additional system tests using the test data parsed in step 310. Step 360. The trace route data stored in step 350 comprises, for example, data indicative of each device that the test stream packets were sent to, such as each device's IP address, and a round trip time determined, for example, in milliseconds. In certain embodiments, if the time is under a certain threshold, for example, ten milliseconds, the return value will be zero thus indicating that there was no appreciable delay in reaching a device along the path between machine 115 and server 110, while in other embodiments, the actual trip time is determined and stored in file 140. In certain embodiments, a return value over a predetermined or other threshold indicates an unsuccessful test.

All test data that was accumulated during testing, including the test data accumulated during steps 330, 350 and 360, is stored by client machine 115 (in step 370) and forwarded (in step 380) to application server 125 for processing. The test data may be stored in test file 140 or a separate file and forwarded to application server 125 for analysis. Once complete, the process begins again by requesting a system test in step 300. It is understood that given specific instructions in the test file 140, the system may return test results upon completion of any one test, a portion of a test, or after a group of tests, for example, after a certain number of tests involving a given content type, streaming server 110 and/or filer 120.

Figure 4:
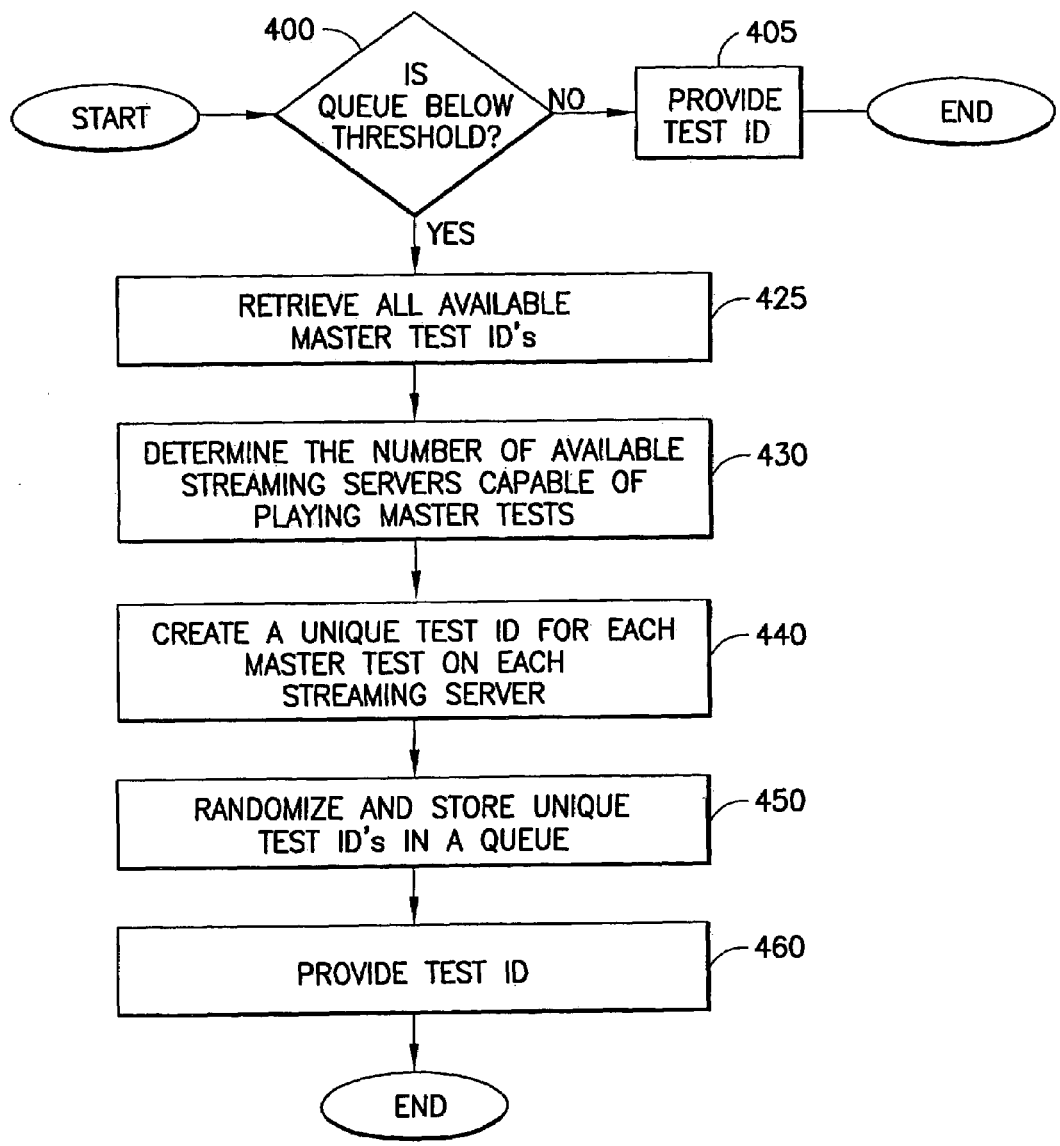
FIG. 4 is a flow chart illustrating the process of requesting a system test according to embodiment of the present invention.

Turning now to FIG. 4, there is shown a flow chart illustrating, in greater detail, the process of requesting a test of step 300 in FIG. 3. The process begins by determining whether or not a queue on database 130 containing the test data files 140 is below a certain threshold. Step 400. In general, this determination ensures a sufficient number of test files 140 exist to satisfy test requests from the client test machines 115. Database 130 is set up to include a queue, that is, there is a list of test data files 140, and as a client machine 115 requests a file 140, the topmost file in the list (in the present embodiment, the oldest entry in the queue (FIFO—first-in-first-out method)) is sent to the requesting test machine 115. The queue is below a threshold if application server 125 receives a request for test data files 140 from machine 115 and determines that there are potentially not enough test data files 140 to distribute to all test machines 115 requesting a test. While in one embodiment of the invention, this determination could be as simple as determining if the number of remaining test data files 140 is equal to zero, other embodiments may set a number, based on the anticipated number of tests, so that the queue will not reach zero in times of peak test demand. That is, when the amount of test data files 140 in the queue is less than the specified threshold, additional tests data files 140 are required to ensure a sufficient number of test files 140 are queued to satisfy potential test requests from all machines 115. In alternate embodiments, instead of a queue, database 130 may store the test data files 140 in any known manner or format and the test data files 140 may be sent to machine 115 either at random or based upon predetermined criteria. The predetermined criteria may include, for example, the location of machine 115 or the processor power of machine 115. In addition, machines 115 located on certain types of sub-networks within network 105 may perform specific tests that are not performed elsewhere. For example, if the sub-network is a corporation's LAN and the corporation desires to test connectivity to one of the corporation's streaming servers 110, server 125 can send test data files 140 containing specific information to test the corporations streaming servers 110 directly to machines 115 having a specific IP address, such as corporate LAN users, for example, to test the specific corporate streaming server 110 at a specific IP address.

If the queue is not below a certain threshold, server 125 provides the test data file 140 to the client machine 115. Step 405. As described above, test data files 140 are comprised of information that permits client machine 115 to locate and perform a test of the system 100, receive digital content and return the test results to server 125. The test data files 140 not only contain information to perform the test, it may also contain fields to store the test results. As such, test machine 115 requests the test file 140 and uses the information to perform the test. Once test results are obtained, the test values may be stored in the test data file 140 and forwarded to application server 125 for analysis. The test files 140 may be stored in database 130 on application server 125 or on any storage device connected to network 105 and accessible to server 125.

If the queue is below a predetermined threshold, a process is performed to replenish the queue with test files. In general, prior to the initiation of this process, a supervisor or operator of the system creates a Master Test with a Master Test ID for each piece of digital content to be tested on servers 120. The Master Test identifies the piece of digital content to be tested as well as other identifying data and the type and conditions of test to be performed. A Master Test is created for all newly added digital content to be tested. Using the Master Test ID, the process described in FIG. 4 creates a unique test and test ID for each piece of digital content on each streaming server that is capable of playing the Master Test. In an embodiment of the invention, the Master Test may be a test data file 140 without any information pertaining to the identity of the streaming server. In creating a unique test and ID, the process may make multiple copies of the Master test and fill in the appropriate streaming server data.

Referring to FIG. 4, server 125 retrieves all of the available master test ID's, step 425, and determines which streaming servers are available to run the master test associated with the master test ID. Step 430. The determination of how many servers 110 are capable of playing the master test file and data referenced therein is based on, for example, one or more factors such as geographic location of server 110, connection speed of server 110 to network 105 and the like. It is understood that other factors may exist that prevent or limit the availability of server 110 to play a file 220 referenced in test file 140.

Once server 125 determines the number of available streaming servers 110 that can play the streaming data 220 stored on archive filer server 120 and referenced in the master test, server 125 creates a test data file 140 unique to each file 220 identified in the master test for each streaming server 110 capable of playing the test. Step 440. These unique test data files 140 are then randomized and stored in the queue in database 130. Step 450. It is understood that these tests do not need to be randomized to practice certain embodiments of the invention and instead could be utilized in any logical order. Server 125 then provides a test ID to the requesting computer and the process ends. Step 460. In an alternate embodiment, the process for adding new live tests may include polling all live streaming servers 110 to determine if any new live test feeds are present and then creating unique test data files 140 for each server 110 that is connected to live encoder 123. In yet another embodiment, step 460 may be provided directly after step 400 is performed and the queue is below a certain threshold.

In another embodiment, a backup copy of the queue may be stored on a backup storage device and if server 125 determines that no new content 220 or master tests have been created, server 125 may simply restore a copy of the queue from a backup storage device. It is understood that while FIGS. 3 and 4 show the process of requesting a system test (Step 300) to include checking the queue and refilling the queue when empty, these processes may run independently of each other. It is also understood that in alternate embodiments of the invention, reference to streaming media or streams may be synonymous to digital content 220 as a subset of digital content.

Figure 5:
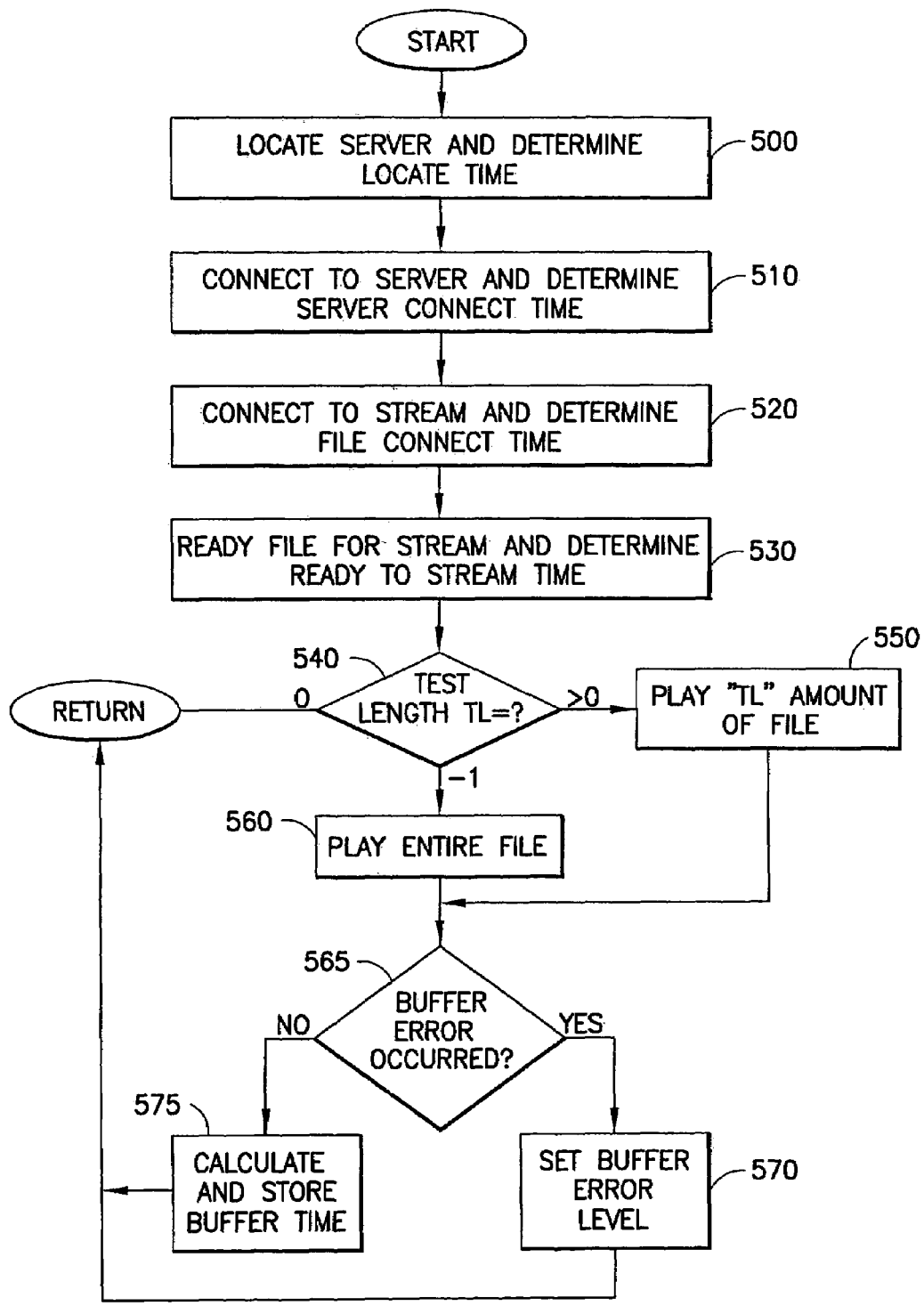
FIG. 5 is a flow chart illustrating the process of performing a system test according to embodiment of the present invention.

Referring to FIG. 5, there is shown a flow chart illustrating, in greater detail, the process of performing a system test of step 360 of FIG. 3. The test referred to in step 360 tests the systems on client test machine 115 that playback the digital content file 220. The tests performed may be, for example, the time it takes client test machine 115 to connect to a streaming server 110, the time it takes to access the streaming media file 220 on archive filer server 120, the time it takes client test machine 115 to get ready to play file 220, the time it takes test machine 115 to play the file 220, the number of playback errors encountered during playback and the like. It is understood that any number of tests can be performed on the playback of streaming media file 220. These tests could be developed exclusively for a particular type of media content or developed for a broad category of content. In addition, the tests may be performed natively by a program designed to play the digital content.

According to an embodiment of the invention, the test data parsed in step 310 of FIG. 3, such as streaming server URL, test file URL (URL or ID file 220), test duration, etc., is used by client machine 115 to locate the streaming server 110 for the test file 220 and to determine the time to locate the server 110. Step 500. Next, machine 115 attempts to connect to the server 110 and determine the server connect time. Step 510. Using the video test file URL, machine 115 attempts to connect to the digital content file 220 and determine the time to connect to file 220. Step 520. Once connected to streaming server 110, client test machine 115, depending upon values contained in test data files 140, for example, test length or duration, may request to play all or a portion of a digital content file 220 contained in test data files 140. Once requested by client test machine 115, server 110 accesses file 220 and broadcasts it to machine 115. Once connected, machine 115 readies the file 220 for streaming (if streaming media) and determines the time to ready the stream. Step 530. The time to ready the stream includes the time needed to store a portion of the data stream in the memory of machine 115, i.e., buffer the initial data of the streaming content to broadcast.

Next, machine 115 retrieves the duration of the test that should be played, if required, from test data file 140. Step 540. The test data file 140 may include certain codes or defaults that signify the duration of the test to perform on machine 115; for example, a value of zero precludes the running of the test and only the information from steps 500 to 530 are determined and returned to the application server 125, while a value of negative one results in the playing of the entire file. Step 560. It is understood that additional codes or default values may be included in the test data file 140 and retrieved by machine 115 in step 540. For example, a value of negative two may instruct the player to load one unit of memory with the stream and play the file for one unit of memory. In an additional embodiment, these values may be adjusted depending upon the type of test run. For example, if the test were to load a web site, then a value of "W5," for example, may signify to load the website 5 times. So long as the codes in the test file correspond to the test run by, or are understood by, the test machines, the codes could be any value. In this embodiment, the media file 220 could be HTML code used to create a web page or a separate URL to access a particular page.

Test data files 140 includes the duration of the test, and if it is a value greater than zero, the streaming server 110 will play this amount of time of the file in step 550, and the process will proceed to step 565. The amount of time could be set in seconds or minutes, frames or any other measure of duration.

Regardless of whether all or a portion of the streaming file is played (based on the determination of step 540) machine 115 determines whether or not a buffer error has occurred. Step 565. In operation, the media player stores a portion of the data stream (i.e., buffers) in order to start playing the data stream before the file is completely downloaded. Occasionally, network traffic prevents the continual playing of streaming media, and data in the buffer is used when no streaming media is present. One example of a buffer error occurs when the buffer is empty and no new streaming media is present. If the error is temporary, the buffer will eventually contain new information to play. If the traffic prevents adding data to the buffer eventually the buffer is empty and playback stops. As such, this type of error may reoccur more than one time, resulting in additional buffer error. Each such error is recorded by machine 115. If the network traffic is such that the buffer does not contain new information after a period of time, the process of playing the file will timeout and a fatal buffer error is recorded. If no buffer error occurred, machine 115 calculates an initial buffer duration, stores the value on machine 115, step 575 and then the process returns to the calling program. If a buffer error did occur, the nature of the buffer error and the time duration of the initial buffer and additional buffer are stored on client machine 115 in step 570.

Figure 6:
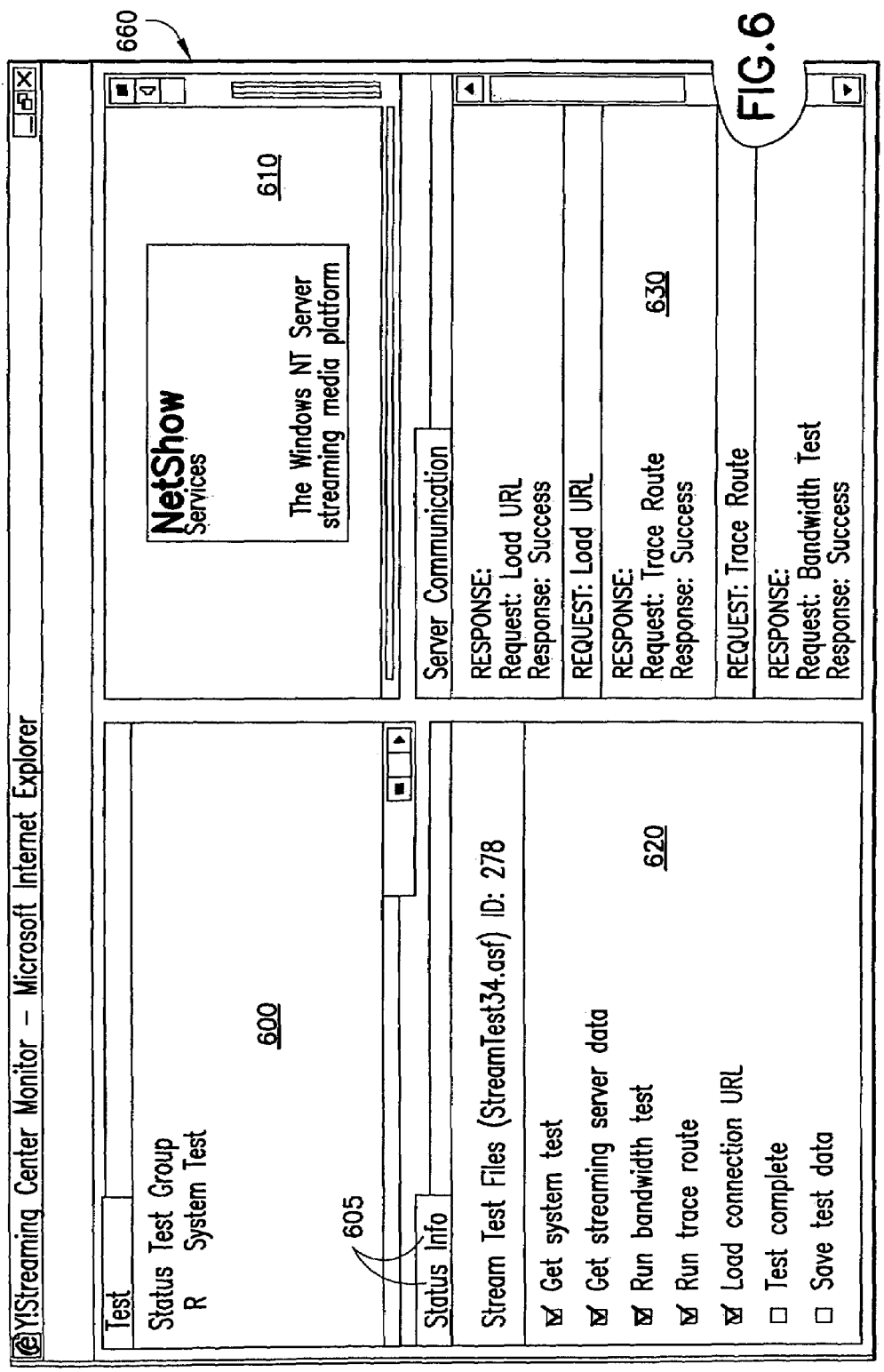
FIG. 6 is a graphical user interface according to one embodiment of the present invention.
Figure 7:
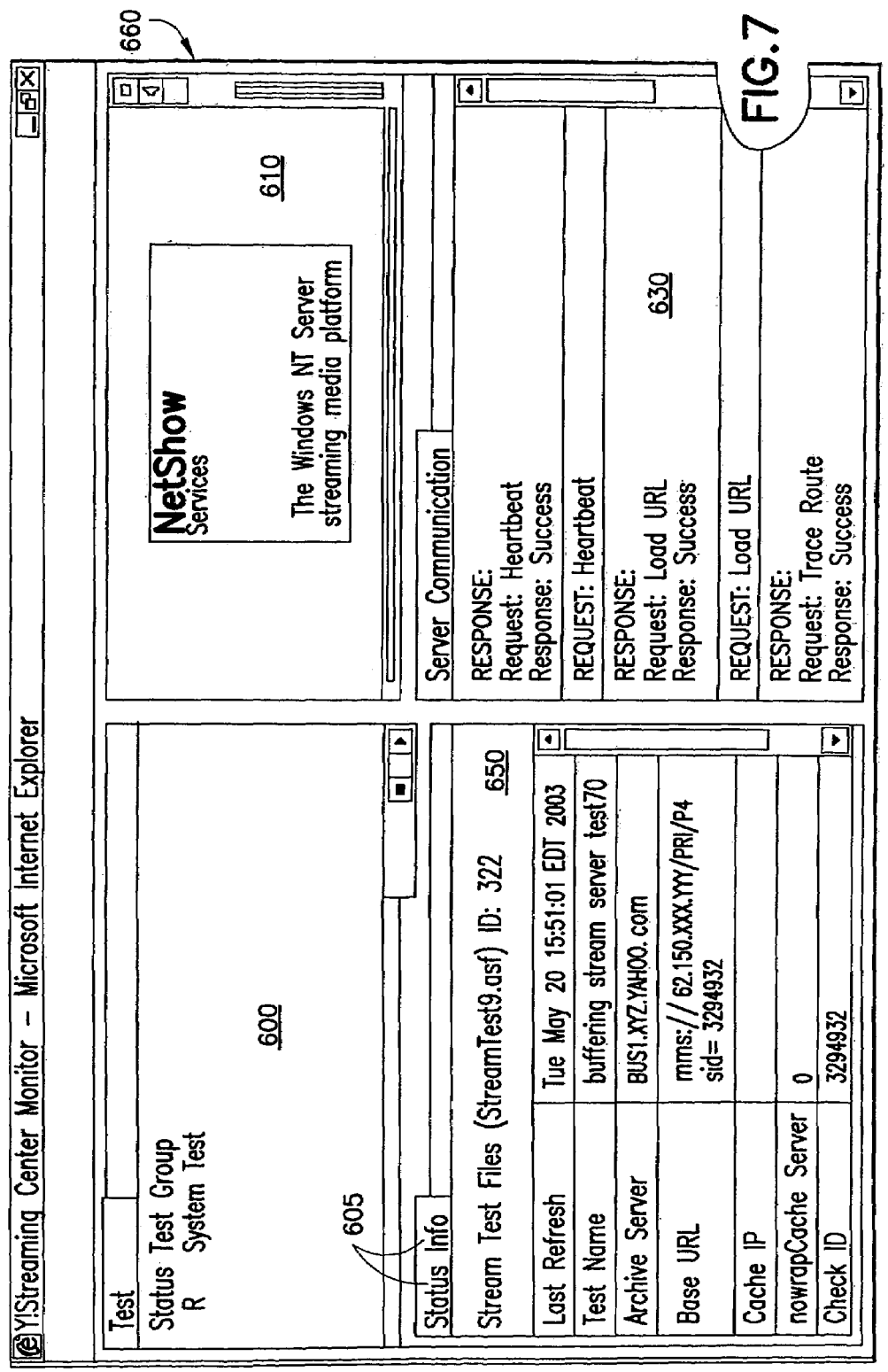
FIG. 7 is a continuation of the graphical user interface of FIG. 6.

Referring now to FIGS. 6 and 7, there is shown a graphical user interface of one embodiment through which a user at the requesting client test machine 115 views the progress of the test, such as the process of FIG. 3. Once the web monitoring interface 660 is opened and machine 115 is successfully connected to server 125, test data files 140 are automatically sent to machine 115 and the tests performed. Web monitor interface 660 is comprised of at least one, but preferably four, sub windows, including a test window 600, a media player window 610, a current status window 620 and a server communication window 630. It is understood that the current status window 620 and the server communication window 630 may present the information in real time or may present the information with varying degrees of delay. Furthermore, the current status window 620 includes sub window selector buttons 605 that permit the user to select between "status" and "info" sub-windows. Selecting the "status" button, will display a current "status" window 620, while selecting "info" button will display a current "info" window (shown in FIG. 7 as item 650).

In operation, web monitor interface 660 visually displays the types of tests performed in window 600, the status of the current system test in window 620, the actual digital test content, including streaming media, in player window 610, and the status of the communications between the client test machine 115 and the streaming server 110 in window 630. With the "status" selector button 605 selected, current status window 620 displays, in real time, the status of each test being performed according to FIG. 3. As each test is successfully performed, a check mark or other indicator is placed next to the description of such test. Window 630 visually displays the requests by client test machine 115 and the response from streaming server 110, with the most recent server communication displayed at the top of window 630. With reference to FIG. 6, the load connection URL may refer to obtaining a URL to file 220 and performing the series of playback tests previously described.

With the "info" button 605 selected, Window 620 displays current information, pertaining to the tests. It is understood that more or less information can be contained in each test. Examples of some of the information fields contained in the test file include the last refresh date and/or time (last time the test file 140 was modified), the test name, the archive filer server name, the base URL of the test (URL of content file 220 to test), a cache IP (relating to the IP address of a cache device that is used to stream media in an alternate embodiment of the invention), and a unique check ID (used to identify file 220). In addition, the following examples of test information fields may be listed: check ID type (referring to type of streaming data of file 220, for example, a single stream or a playlist group of streams), test duration, content file 220 name, Kbps (transfer rate), packets lost, packets received, packets recovered, path (physical path of test video file 225 on filer 200), Playlist IP address (The operation of an exemplary Playlist application is described in PCT Application Number PCT/US02/01840 filed Jan. 18, 2002 entitled, "Method And System For Managing Digital Content, Including Streaming Media" which is commonly owned by the Assignee of the present invention, the entire disclosure of which is hereby incorporated by reference in its entirety), Playlist URL, port to use on server 110, protocol, query string (used to pass any additional information when creating the test, for example the ID test creator, purpose of test, description of test, expiration of test, and the like), linked share (name of share 210 containing the video test data file 220, secure authorization ID required (whether permission to access file 220 is required, in which case the user requesting the test is first authorized/authenticated), secure interval (time period within which the machine 115 has to connect to the secure file and authenticate using a secure key), secure key (digital code used to authenticate client machine 115), streaming server IP address, streaming server DNS, streaming server URL, test length (length of file 220 to play), test start time, test tracking ID (numeric or alphanumeric ID for test data files 140), test type ID (numeric or alphanumeric ID for the type of test run, for example, STREAM, PLAYLIST, TRACEROUTE, bandwidth, playback, web page, transmission, all, etc.), test type name (numeric or alphanumeric name of test type), time stamp (time test created), time to connect (total time to connect to stream), trace start IP (IP address of client machine 115), trace destination (IP address of server 110), trace ran (Boolean expression if the traceroute test was performed or not), and trace result (the sum of all times for the test). In an alternate embodiment, one or more tests, or combinations thereof can be run depending upon the information included in test file 140.

Some of the data necessary to perform the test is contained in the test file 140 prior to receipt of file 140 by machine 115 as part of the test file 140, while the remainder of the data may be filled in by client machine 115 as certain information is determined during the course of the tests. When the test data is obtained, it is stored in the test file 140 and forwarded to application server 125 for storage in database 130. In addition, the information in file 140 can be removed, either for an individual file, for a subset of the files or from all of the files for processing and analysis by server 125. Although any arrangement of one or more tables can be used, the records preferably include a separate field corresponding to each item of data that is collected, displayed or utilized in performing, evaluating or displaying the test and results.

Figure 8:
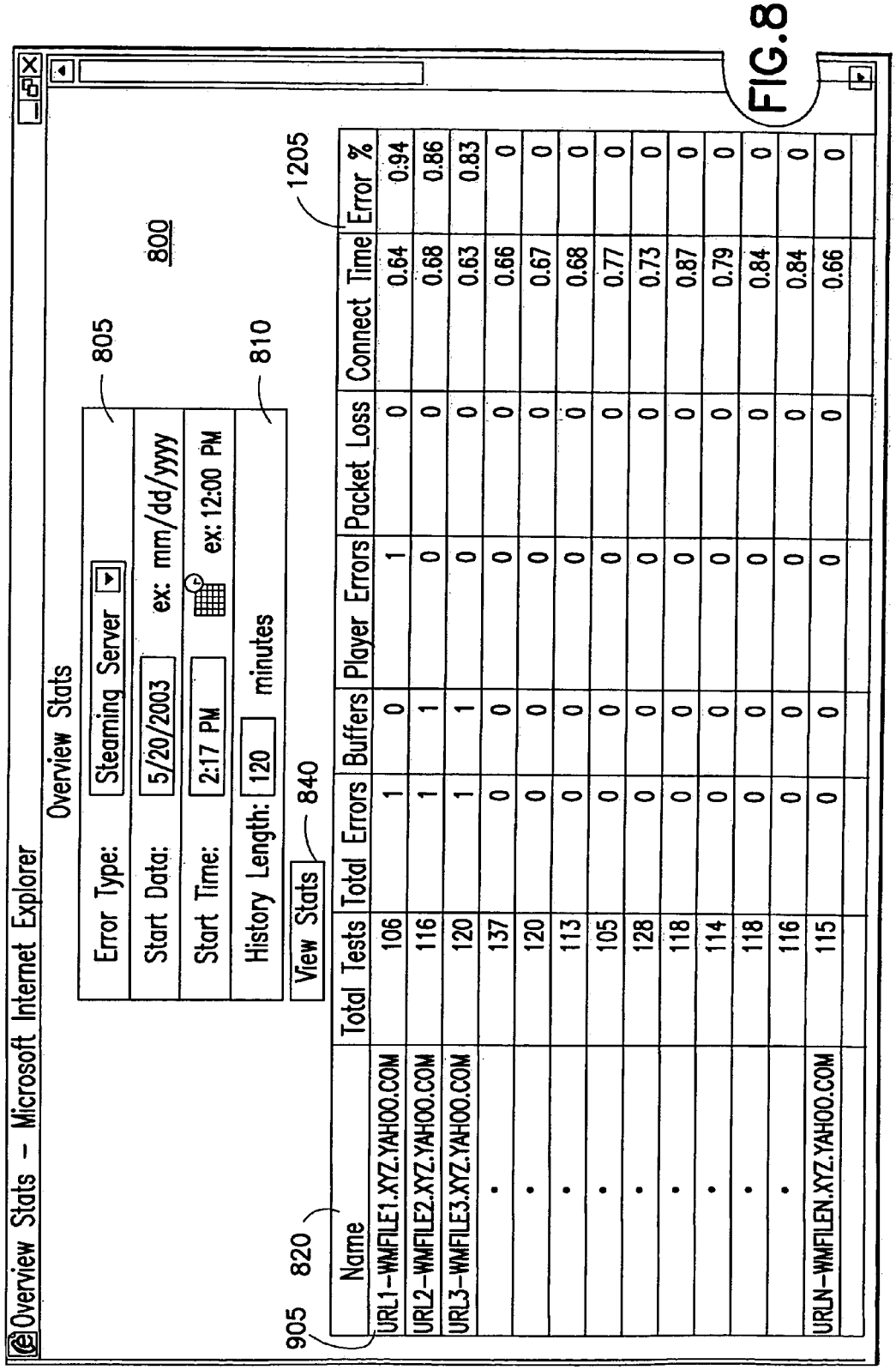
FIG. 8 is a screen shot of overview statistics for error types grouped by streaming server names according to one embodiment of the present invention.

Referring to FIG. 8, there is shown an illustrative screen shot of a graphical user interface for providing overview statistics for error types grouped by streaming server name. Streaming server overview statistics window 800 displays in tabular form a list of the overview statistics sorted by error type field 805 having a value equal to "streaming server". A history length field 810 permits a user to enter a time period, such as, for example, a number of minutes, wherein all search results within the entered time period prior to the request are displayed. Once the appropriate data is entered in fields 805 and 810, the user clicks on a "view stats" button 840, and the relevant information is retrieved from storage based on the selected parameters. Accordingly, the information, in this embodiment, a list sorted by percentage error column 1205, is displayed.

Error type 805 is a pull down menu that allows the user to select any one of the following error figures to view, for example, streaming server, subnet cache IP (the IP address of a subnet device), mount point, share, filer and origination IP. In the example illustrated, error type is streaming server name. As a result, a list of all available streaming servers is displayed and may be sorted by the first column, a streaming server name column 820. Additional columns listed in the table are total tests, total errors, buffers, media player errors, total packets lost, connect time, and percentage error. Clicking on the title of any column will sort the current list by that particular column name. Each row in the table represents the aggregated test results for that particular server 110 identified by their URL, for example, URL 1 through "n". Additionally, clicking on a selected streaming server name 905 will launch an additional window providing overview details for the selected streaming server name 905, as shown in FIGS. 9 and 10.

Referring to FIGS. 9 and 10, there is shown two views of an illustrative graphical user interface for providing an overview detail window 900 for a selected server 905 from the streaming servers 110. Overview detail window 900 displays in tabular form a list of all of the tests files 140 for selected streaming server 905 and includes columns that correspond to fields contained in test file 140. A detail column 950 contains a link 1105 to view specific detailed information about a particular test 140 for an associated test tracking ID number 1110 contained in test tracking ID column 940. In addition, a column selection button 960 is located on overview detail window 900 and permits the user to select additional columns to view on overview detail window page 900. Some of the non-selected columns, having been previously described, for example, are playlist URL, Playlist IP, Cache IP, Streaming Server URL, Root Share, Share, Physical Path, Querystring, Check ID, Check ID Type, Packets Lost, Packets Received, Packets Recovered, Secure Key, Secure Time Interval, Secure Authorization ID Required (Boolean value), CMS Location ID (additional data to identify stream location), Base URL, Port, Protocol, Trace Ran, Trace Result, Trace Start IP, Trace Destination IP, Kbps, Create Date, and Last Modification Date.

In an embodiment of the invention, approximately nineteen columns spanning FIGS. 9 and 10 are selected and displayed. The columns are: Detail, Test Tracking ID, Duration To Test, Connect Step 1—Locate Server Duration, Connect Step 2—Connect To Server Duration, Connect Step 3—Meta Data Received Duration, Connect Step 4—Ready To Stream Duration, Total Connect Duration, Initial Buffer Duration, Additional Buffer Duration, Total Buffer Duration, Actual Test Duration, Total Error Count, Total Buffer Count, Stream Server DNS, Stream Server IP, Archive Server, Start Time, and Trace Start IP. Referring to FIG. 10, there are shown several columns and in particular, a stream server DNS column (domain name server), a stream server IP column 920 and a archive filer server column 930. In addition, a trace start IP address column 935 contains the ID address of client machine 115.

With reference to FIGS. 9 and 10, the illustrative most recent test, Test Tracking ID=25821067 took approximately 471 ms to perform the four steps (500, 510, 520 and 530) described in FIG. 5. The initial buffer duration, i.e. the time it took to buffer a portion of the streaming media was 5808 ms. Since the "duration to test" is equal to 15, 15 units of time of the video test file was played. The units of time may be hours, minutes, seconds, frames or the like. This test, connection, setup and play, took approximately 21872 ms (Actual test duration). The Stream Server DNS is "wmfile1.xyz.yahoo.com" and the Stream Server IP address is 63.123.456.1 with a subnet value of 456. Since FIGS. 9 and 10 are printouts specifically for selected server 905, all of the Stream Server information should be the same. The archive filer server 120 was found at "\bus1.xyz.yahoo.com". The IP address of the client test machine 115 was 63.888.123.1. There was no error count for this test. Note that for those tests where the Duration to Test is 0, the streaming file is not played and therefore there is no Initial Buffer Duration and the Actual Test Duration is equal to the Total Connect Duration. The traceroute performed was from IP address 63.888.123.1 to streaming server at IP address 63.123.456.1.

Figure 11:
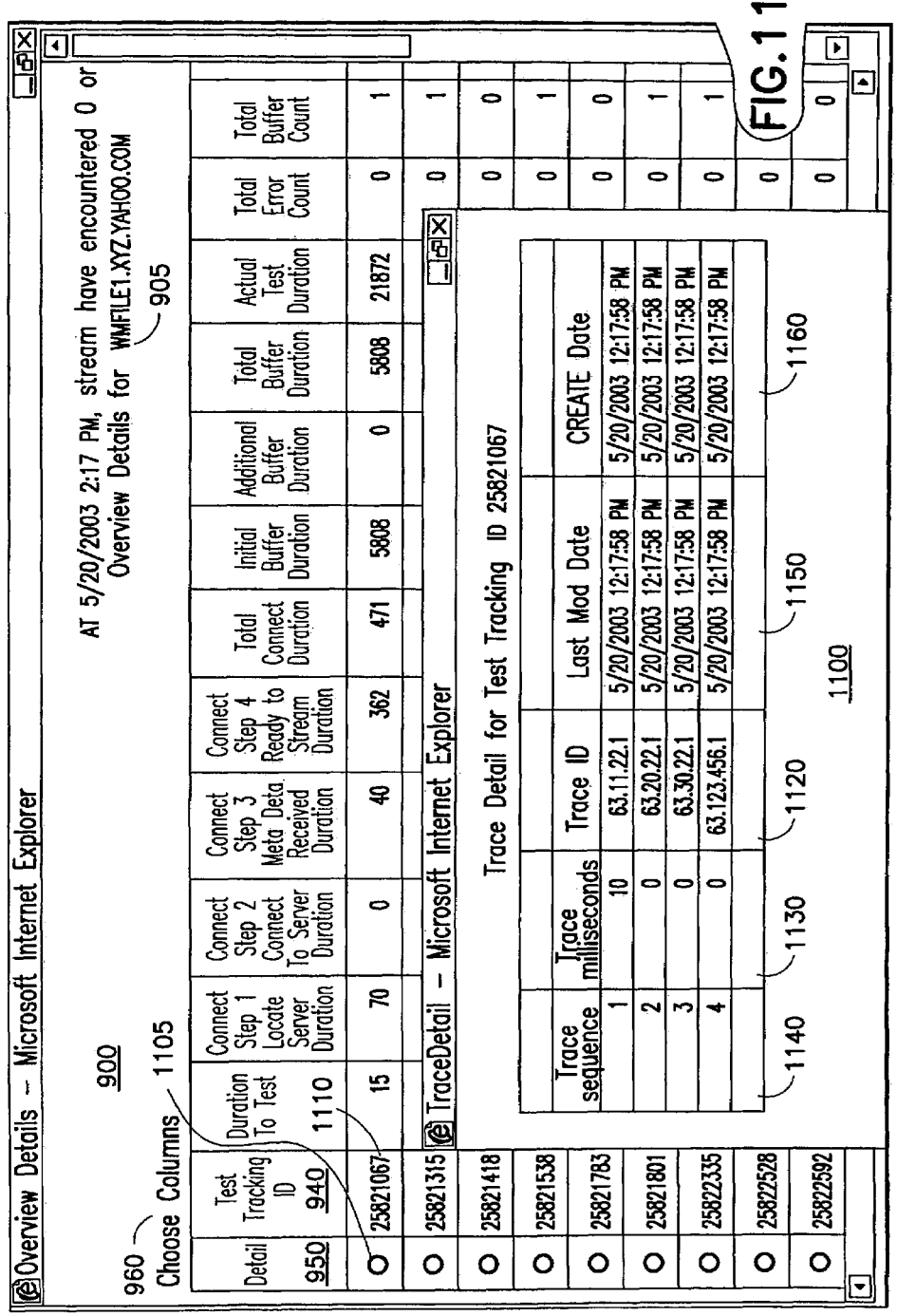
FIG. 11 is a screen shot illustrating trace detail for a selected entry of FIG. 9.

Referring now to FIG. 11, there is shown an illustrative screen shot of trace detail for a selected entry according to FIG. 9. A trace detail window 1100 lists in tabular form the results of the trace route test. Window 1100 is accessed by selecting link 1105 for a particular test ID 1110. The trace route program maps a path from one computer to another across a network. Each leg or "hop" terminates at a different IP address along a path from one computer to another. The round trip time duration for each trace sequence is calculated and stored by the trace route program and client machine 115. If an embodiment of the invention, any hop that takes less than 10 ms to complete is stored as a zero value. In alternate embodiments, the actual time to complete each hop may be stored.

Window 1100 contains a trace sequence column 1140, a trace duration column 1130, a trace IP column 1120, a last modification date column 1150 and a creation date column 1160. The information contained in each row of this table is stored and forwarded to application server 125 for processing. It is evident for test tracking ID number 25821067, that the trace route program was successful in reaching its destination in four "hops", where a "hop" is equal to one leg of the trip from client machine 115 to streaming server 110. Each leg usually terminates at a router, switch, server or other device that forwards packets of data to other devices. According to the information contained in FIG. 11, it took 10 ms to get from Trace Start IP address 63.888.123.1 to 63.11.22.1, less than 10 ms to get to IP address 63.20.22.1 (since there is a zero value), less than 10 ms to get to IP address 63.30.22.1 and less than 10 ms to get to the Streaming Server located at IP address 63.123.456.1. Accordingly, the total round trip time was approximately ten milliseconds, as three of the four legs required under ten milliseconds to reach its destination thus resulting in a value of zero for those legs.

Figure 12:
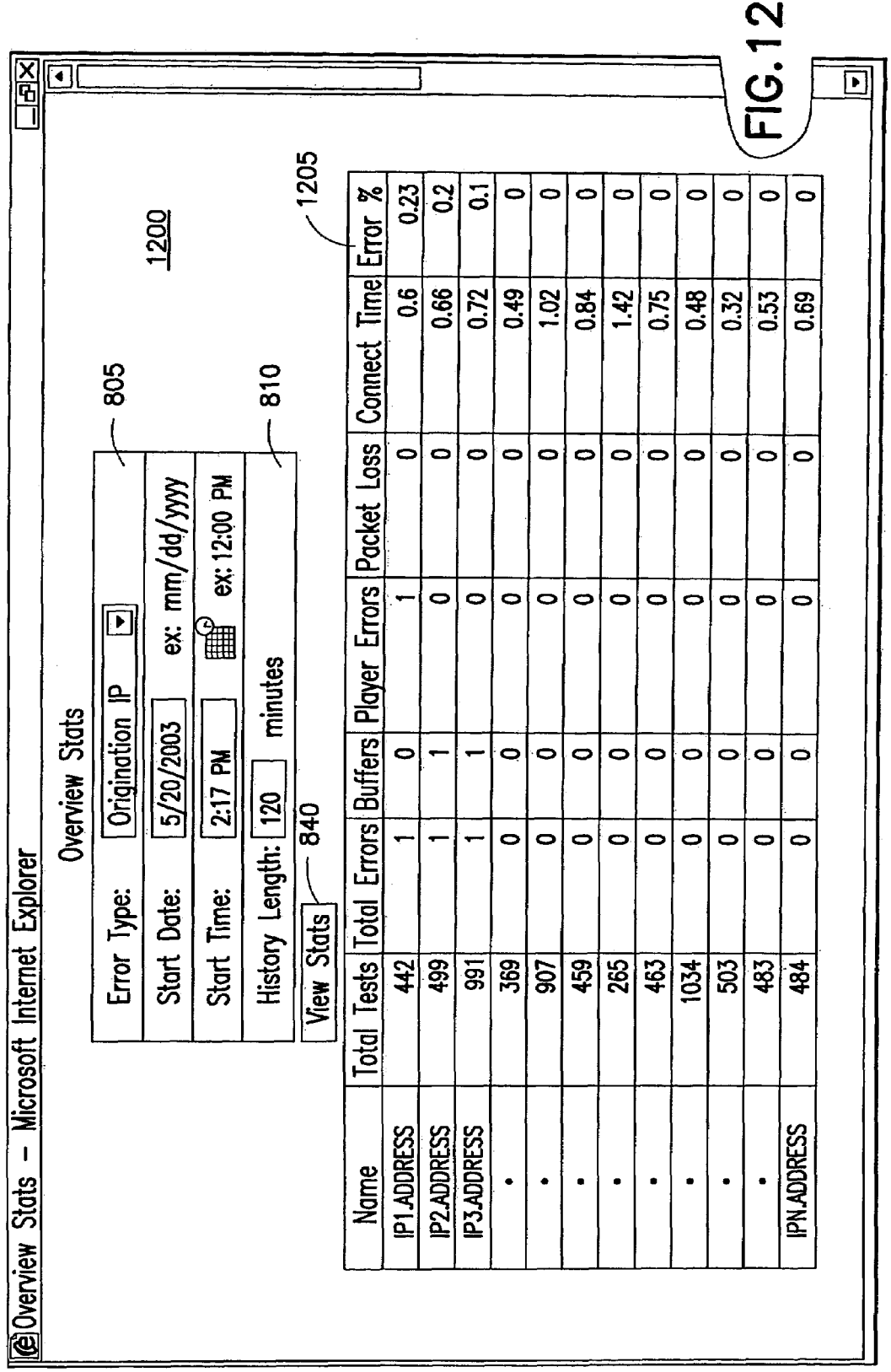
FIG. 12 is a screen shot of overview statistics for error types grouped by originating IP according to one embodiment of the present invention.
Figure 13:
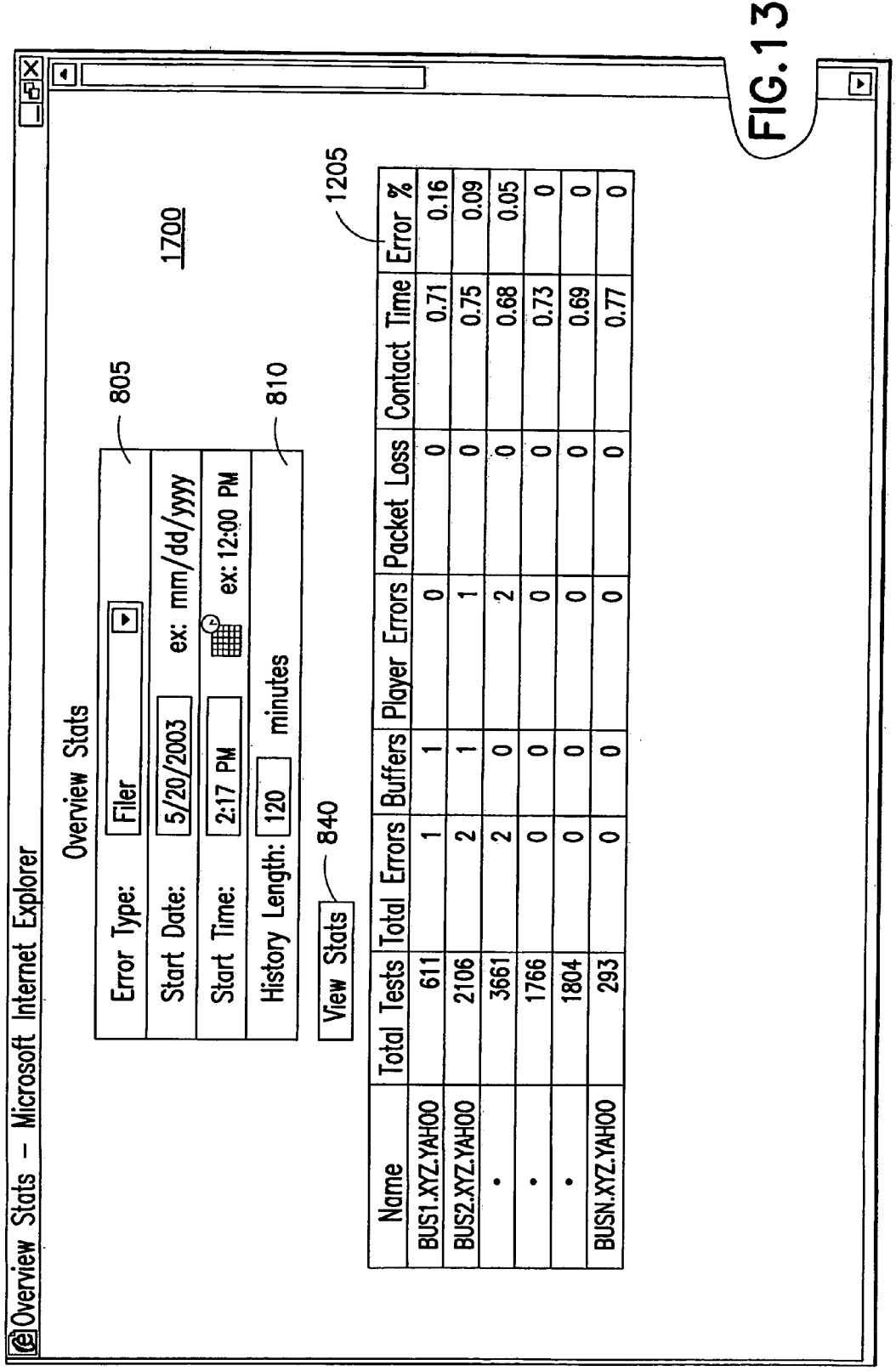
FIG. 13 is a screen shot of overview statistics for error types grouped by a filer server according to one embodiment of the present invention.
Figure 14:
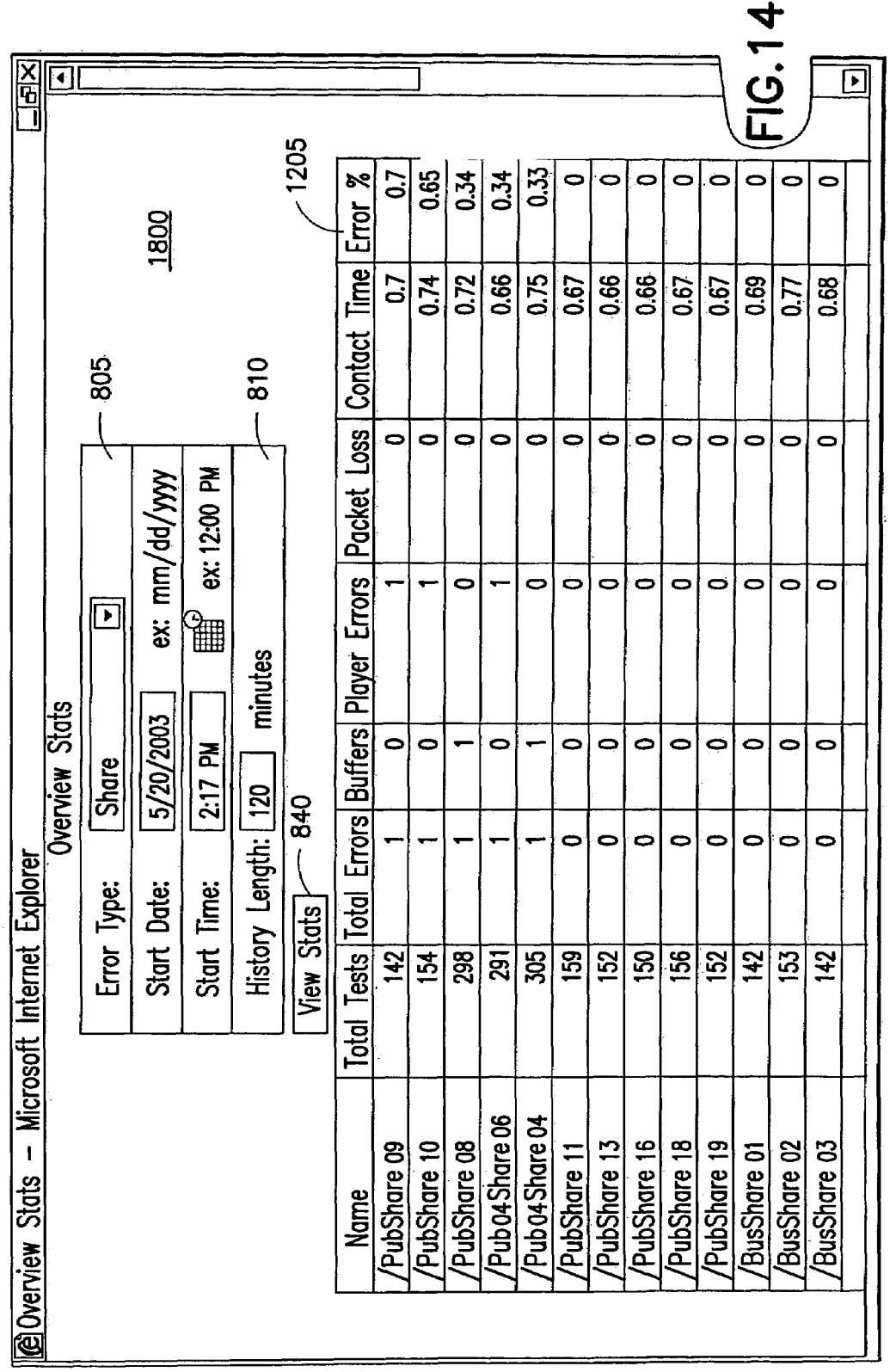
FIG. 14 is a screen shot of overview statistics for error types grouped by share name according to one embodiment of the present invention.

Referring now to FIGS. 12-14, there are shown illustrative screen shots of overview statistics for error types grouped by origination IP, filer, and share, respectively. The ability to sort the error types grouped by these selections facilitates troubleshooting of the system. For example, a rise in a percentage error column 1205 indicates a potential problem with a particular portion of the network. Referring to the interface of FIG. 8, sorting window 800 by percentage error column 1205 will, for example, isolate the streaming servers with the highest error rate. If the error rate is above a tolerable threshold of error, then an alert (e.g., email, popup screen, etc.) can be generated, identifying the error, server and any other collected information. This server can be isolated for additional inspection and troubleshooting. Additionally, in the event of an alert, corrective action could automatically be taken, such as the system 100 routing around the degraded portion or streaming content from components whose performance has not been degraded. This may be implemented in any of multiple ways, including, for example, running a software routine that would identify requests to a particular streaming server and would insert a substitute URL identifying a replacement or backup streaming server 110 into the request. In such embodiments, both the original and backup servers 110 may share the same media files stored as file 220, or the backup may have access to a separate copy of the content. Given the distances and amount of data transferred for streaming media, a small percentage of error is to be expected. While the goal of all service providers is 100% error free transmission, realistic tolerable error rates can be established and set as the alert threshold. In alternate embodiments, multiple alert levels can be set with different actions being (automatically) taken based on each alert. For example, a first alert would provide notification and a second, more severe alert would result in a backup form of operating like rerouting of content away from the faulty equipment. Alternatively, alerts may be associated with multiple notification devices, such as one email address for an alert and then escalating to an automatic telephone call if that alert is not responded to or if a second alert is generated. Given the error checking and correction coding included in most data transfer formats, a small amount of error in the transmission should not effect the media quality. However, each supervisor can establish a tolerable error level for each network component. For example, if a corporation owning a streaming server 110 wants to establish a particular tolerance error level, only when that error level is breached will an alert be sent to either the supervisor or corporation.

Referring to FIG. 12, sorting of window 1200 by the percentage error column 1205 isolates the IP address of a client test machine 115 that is experiencing the relative greatest difficulty connecting to the streaming media servers 110. The error may be a problem with the client machine 115 or with the streaming server 110 that is providing the requested media to the client test machine 115. In addition, inspection of the trace route data from this client test machine 115 may determine if there is a problem connecting to the streaming server 110. Window 1200 displays a list of the client test machines 115 that have performed tests within the selected history length 810. The percentage error column 1205 is a function of the Total Errors divided by the Total Tests. The total errors may also include the total number of "issues," that is, the number of player errors and the total number of buffer errors. In addition, the amount of tests performed on a particular machine also is a factor in determining the accuracy of the percentage error. For example, a machine that has completed 1,000 tests with a 40% error (400 errors), will set off an alert and require attention, while a machine running only ten tests with four errors (while having the same error rate) may not issue an alert until a minimum number of tests are performed. This set number may be determined by a supervisor or by an individual in a client's organization. Some machines may perform many more tests than other machines and therefore machines with only a few tests and a few errors should not issue an alert absent a minimum number of tests performed. While there are many criteria that would determine the amount of tests a given client test machine 115 could perform, it is preferably a function of the proportion of the history length that the machine has been testing, the speed of the machine, the speed of the connection to the network 105, the length of each test performed and similar factors. In addition, some machines, may be dedicated testing machines while others may be testing only in the background, while still other programs are running only when a screensaver program is activated. Utilizing unused processor capacity while a computer sits idle may permit a vast number of client test machines to perform tests throughout the network and with limited negative impact on the network system. The process of testing the system may be incorporated into an .exe file and distributed to many client test machines for widespread testing of the network. Such an .exe file could monitor the machine and initiate a test upon sensing any of a number of applications, including, for example, an idle system, certain time of day, and the like. It is understood that the process described in embodiments of the invention may be incorporated into any known program language or implementation and distributed to client test machines for execution on the machine.

Referring to FIG. 13, sorting of window 1700 by the percentage error column 1205 isolates the name of the filer 200 that is experiencing difficulty providing the streaming media content. These errors may be caused, for example, by a failing piece of existing hardware or the addition of additional hardware that may be causing a conflict within the filer 200. Lastly, referring to FIG. 14, sorting window 1800 by the percentage error column 1205 isolates the name of the share that is experiencing difficulty providing the streaming media content. This error may be caused for example, by a failing piece of existing hardware, i.e. hard drive or an improperly installed or configured new share.

It is understood that sorting the test results by one or more of a particular category of test results, for example, filer address, streaming server IP address, test name, streaming server URL, packets lost, and the like, assists in the determination of potential points of failure. In addition, additional tests may be implemented and the test results aggregated. For example, the address of memory where each digital content file is sent from on streaming server 110 or the serial number of the motherboard for each streaming server, etc.

An embodiment of the present invention may also group the test results by region, for example, Europe, Asia, South America, North East United States, etc., to facilitate the determination of the integrity of the network. The ability to separate the test results prevents the data from one area affecting the results of another area, and permits the supervisors for a particular area to determine the quality of service to that particular area. In one such embodiment, the association between one or more servers and their geographic region is stored in a table in memory. Selection of a region causes a lookup of the table to identify the corresponding servers, for which their data is then retrieved. The results may also be grouped based upon the originating IP address of the client machine 115 that performed these tests. As such, client test machines 115 having IP addresses with a common net or subnet value could be aggregated together. In addition a database of client machine 115 physical locations and IP addresses could be consulted to determine the geographic location of client machine 115. It is to be understood that there are other methods that may be utilized to sort the test results based upon the region where the tests were performed by machine 115.

Given the vast amount of test data that could be generated by the system, the supervisor may, for example, at some predetermined time, like every 48 hours, aggregate the test results and discard some or all of the individual test data. Examples of values determined and stored using the aggregated test results are: Additional Buffer Time (total amount of Buffer time per test; or the average time for a particular test; or the average time of all tests on a particular machine 115 or 110; or the average time for a particular stream ID), Connect Time (either average or total time to connect from test machines 115 to a streaming server 110), and Uptime (Total test/Errors for each streaming server 110). These results then can be displayed in a graph to show historical information about the integrity of the system over time. It is understood that any or all of the individual test data could be stored indefinitely or used to create other aggregated test results by performing a mathematical algorithm on one or more of the aggregated test results to generate statistical information.

In an alternate embodiment, an additional icon may be placed next to detail icon 1105 of FIG. 9 indicating that an error occurred and what the nature of the error was. Examples of such error types are found natively in media players from third parties. The following examples of error codes are not native to the media players and are customized by the system provider: —The maximum time to load file 220 was reached, therefore, the test was stopped as there must be an error preventing access to file 220; The maximum time to Play the file 220 was reached after the file 220 was loaded. As such, the test was stopped. (This error would override the playback of file 220 where information in the test file 140 indicated to test playback of the entire file); The maximum time to Play the file 220 was reached however the file 220 was never loaded. As such, the test was stopped; A Buffering Problem occurred where Multiple Begin Buffers Events occur without corresponding End Buffering Events (indicating that there is a problem with the content player); Test Failure occurred where Meta Data (descriptive information) is not Received from the test data file 140; Test Failure occurred where the Ready to Stream state was never reached. It is understood that additional error codes corresponding to an error condition can be included to identify additional types of errors. In addition, the an embodiment of the invention can perform certain corrective measures depending upon the error code, for example, resend the test file 140 with a different streaming server 110 in order to establish that the error is with the streaming server and not with the client test machine 115.

While each individual test performed on the system yields useful information to diagnose the relative integrity of systems that provide digital content, the combination of the tests permits the supervisor to quickly locate any point of failure or system degradation or problem with playback. In addition, the aggregation of the test results permits a supervisor to sort the results based on a variety of data to debug problems and "fine tune" the equipment having any potential problems. In addition, a mathematical algorithm may be performed on one or more of the aggregated test results to generate statistical information that is also useful in determining whether there is any degradation to system 100.

While embodiments of the present invention are directed to testing streaming media of a content provider, it is understood that other embodiments may be used and configured (e.g., by private industry) to test the integrity of their internal networks. For example, a private individual or corporation may set up private streaming servers 110 to deliver both live and archived content. As a premium fee service to this individual or corporation, the owner of the present system can create test data files 140 that direct test machines 115 to locate these private servers 110 and access digital content, including streaming media from servers 110. Test data files 140 may, for example, contain the URL of the private streaming server 110 along with the URL of a test streaming file to play. The results of all tests returned to server 125 from client machines 115 that accessed the private streaming server(s) 110 may, for example, be aggregated and sorted to provide a snapshot of the operation of the private servers 110 and network 105. The fee may be determined based upon the number of tests performed on client test machines 115 or based upon a set fee for the testing procedures performed, for example, testing only Bandwidth, Transmission, and/or Playback or any combination thereof.

The results of each test or collection of tests may be incorporated into a report and sent to either an administrator in charge of monitoring system 100 or to a corporation requesting testing of their equipment. The report could contain suggestions for improving the efficiency of the network 105 based upon congestion points identified after viewing the aggregated data from client test machines 115. In addition, the report could contain the raw results with a brief summary of the data for use by a clients IT personnel. This reporting service could be performed for a set fee for the report or based in part on the number of tests performed.

While an embodiment of the present invention is described in terms of streaming media, it is understood that still digital content, text files, web pages, software programs or other data files could be used to test the performance of servers 110 and network 105. For example, a URL to a still photograph or series of photographs could be included in test data files 140 where window 610 displays the still image.

It is understood that some entries in FIGS. 7-14 contain exemplary values where confidential information is concerned. These values may be URL's, IP addresses, etc., as indicated.

Those skilled in the art will recognize that the method and system of the present invention has many applications, may be implemented in many manners and, as such, is not to be limited by the foregoing exemplary embodiments and examples. In this regard, the functionality associated herein may be provided on fewer or more system components. Similarly, any number of the features of the different embodiments described herein may be combined into one single embodiment. Conversely, the features of the embodiments should be viewed as optional and not required by the present invention, unless specified in the claims appended hereto. Moreover, the scope of the present invention covers conventionally known and future developed variations and modifications to the system components described herein, as would be understood by those skilled in the art.

The invention claimed is:

1. A method for digital content, the method comprising:
   generating at least one test data file;
   sending the test data file to a plurality of client test machines, the test data file identifying a streaming server and digital content;
   locating the streaming server identified in the test data file;
   requesting from the streaming server the digital content identified in the test data file;

testing the playback operation of the digital content, wherein the testing generates a plurality of test results,
wherein generating the test data file further comprises:
  storing digital content on at least one filer server;
  creating a unique stream ID for each digital content on each filer server;
  determining the number of available streaming servers to broadcast the digital content;
  creating a unique test data file for each piece of digital content where the test data file contains at least one of a streaming server IP field, a streaming server DNS field, a streaming server URL field or a test name field.

2. A method for testing digital content, the method comprising:
  generating, at least one test data file;
  sending the test data file to a plurality of client test machines, the test data file identifying a streaming server and digital content;
  locating the streaming server identified in the test data file;
  requesting from the streaming server the digital content identified in the test data file;
  testing the playback operation of the digital content, wherein the testing generates a plurality of test results,
wherein generating the test data file further comprises:
  storing digital content on at least one filer server;
  creating a master test having a unique master test ID for the digital content;
  determining the number of available streaming servers to broadcast the digital content;
  creating a unique test data file for each piece of digital content on each filer server available to broadcast the digital content by copying the master test data file and storing descriptive information in at least one of a streaming server IP field, a streaming server DNS field, a streaming server URL field or a test name field.

3. The method according to claim 2 further comprising storing the unique test data files in a queue.

* * * * *